(12) United States Patent
Hoprich et al.

(10) Patent No.: US 10,776,100 B1
(45) Date of Patent: Sep. 15, 2020

(54) PREDICTING DOWNTIMES FOR SOFTWARE SYSTEM UPGRADES

(71) Applicant: SAP SE, Walldorf (DE)

(72) Inventors: Wieland Hoprich, Mannheim (DE); Mirja Hagemann, Berlin (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/376,917

(22) Filed: Apr. 5, 2019

(51) Int. Cl.
*G06F 8/65* (2018.01)
*G06N 20/00* (2019.01)

(52) U.S. Cl.
CPC .............. *G06F 8/65* (2013.01); *G06N 20/00* (2019.01)

(58) Field of Classification Search
USPC ......................................................... 717/168
See application file for complete search history.

(56) References Cited

U.S. PATENT DOCUMENTS

| | | | |
|---|---|---|---|
| 9,063,818 B1* | 6/2015 | Risbood | G06F 8/65 |
| 2007/0010983 A1* | 1/2007 | Bauer | G06Q 10/109 |
| | | | 703/17 |
| 2015/0227838 A1* | 8/2015 | Wang | G06N 20/00 |
| | | | 706/12 |
| 2018/0046149 A1* | 2/2018 | Ahmed | G05B 23/0229 |
| 2019/0149426 A1* | 5/2019 | Almasan | G06F 11/261 |
| | | | 709/224 |
| 2019/0196938 A1* | 6/2019 | Mathen | G06F 11/3616 |

OTHER PUBLICATIONS

Hutter et al.; "Algorithm Runtime Prediction: Methods & Evaluation"; Artificial Intelligence 206 (pp. 79-111); 2014 (Year: 2014).*
Irrera et al.; "On the Need for Training Failure Prediction Algorithms in Evolving Software Systems"; IEEE 15th International Symposium on High-Assurance Systems Engineering (pp. 216-223); 2014 (Year: 2014).*

(Continued)

*Primary Examiner* — Qing Chen
*Assistant Examiner* — Clint Thatcher
(74) *Attorney, Agent, or Firm* — Fountainhead Law Group, P.C.

(57) ABSTRACT

Techniques for predicting the downtime of a software system due to an upgrade of the system are provided. In one set of embodiments, a computer system can receive training data comprising (1) measured downtimes, (2) upgrade object information, (3) upgrade configuration information, and (4) system hardware information for past upgrades of the software system across different operating environments. Using this training data, the computer system can train a machine learning (ML) model to predict (1) based on (2), (3), and (4). The computer system can then receive a query comprising upgrade object information for a future upgrade U, upgrade configuration information for upgrade U, and system hardware information for an operating environment E. Based on these inputs, the computer system can use the ML model to generate a downtime value indicating the predicted downtime that will be experienced by the software system when upgrade U is applied to the system in operating environment E.

20 Claims, 9 Drawing Sheets

(56) References Cited

OTHER PUBLICATIONS

Jain et al.; "Hybrid Artificial Intelligence Model Based on Neural Network Simulation Models for Software Maintainability Prediction"; 2017 International Conference on Infocom Technologies and Unmanned Systems (Trends and Future Directions) (ICTUS) (pp. 705-708); 2017 (Year: 2017).*

Chen et al.; "Outage Prediction and Diagnosis for Cloud Service Systems"; Microsoft.com website [full url in ref.]; Apr. 3, 2019 (Year: 2019).*

Jaech et al.; "Real-Time Prediction of the Duration of Distribution System Outages"; IEEE Transactions on Power Systems 34.1 (pp. 773-781); 2018 (Year: 2018).*

Hutter et al "Algorithm Runtime Prediction: Methods & Evaluation", Proceedings of the 24th International Joint Conference on Artificial Intelligence, Jul. 25-31, 2015, 5 pages.

\* cited by examiner $$R = \begin{bmatrix} 1 & & & & 0 \\ & 1 & & & \\ & & h_1(r) & & \\ & & & h_2(r) & \\ 0 & & & & \ddots \\ & & & & & h_i(r) \end{bmatrix}$$

*FIG. 10*

PREDICTING DOWNTIMES FOR SOFTWARE SYSTEM UPGRADES

BACKGROUND

When the components of a software system are upgraded, the software system will typically experience some downtime while the upgrade process is carried out. During this downtime, the software system is unavailable to end-users and cannot execute its normal functions/operations. In large-scale software systems such as, e.g., enterprise business applications, the length of downtime necessitated by a given upgrade can be difficult for the system's administrators to accurately predict. This, in turn, makes it challenging for the administrators to plan appropriately for the upgrade event.

BRIEF DESCRIPTION OF THE DRAWINGS

FIGS. 4, 5, 6, 7, 8, 9, and 10 depict various components of a ML model designed to predict upgrade downtimes according to certain embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to computer-implemented techniques for performing upgrade downtime prediction—in other words, predicting the downtime that will be experienced by a software system when the system is upgraded.

At a high level, these techniques employ a machine learning (ML)-based approach that makes use of a novel ML model. During a training phase, the ML model can receive training data comprising, e.g., (1) measured downtimes, (2) upgrade object information, (3) upgrade configuration information, and (4) system hardware information for past upgrades of a software system across different operating environments. Using this training data, the ML model can learn how data items (2), (3), and (4) collectively map to the measured downtime (i.e., data item (1)) of each past upgrade event.

Once the ML model has been sufficiently trained, the model can receive a query comprising, e.g., upgrade object information for a particular upgrade U, upgrade configuration information for upgrade U, and system hardware information for a particular operating environment E. Based on these query inputs, the ML model can generate a downtime value indicating the predicted downtime that will be experienced by the software system when upgrade U is applied to the system in operating environment E.

In certain embodiments, the generated downtime value can be presented to one or more system administrators or other individuals who can use it to make appropriate plans for carrying out upgrade U. Alternatively or in addition, the generated downtime value can be fed into a downstream engine which can automatically take one or more actions based on the prediction. These actions can include, e.g., initiating or scheduling the upgrade if the predicted downtime is less than a predefined lower threshold, signaling an alert or escalation if the predicted downtime exceeds a predefined upper threshold, determining and providing one or more recommendations for reducing the predicted downtime, and so on.

The foregoing and other aspects of the present disclosure are described in further detail in the sections that follow.

2. Software System/Operating Environment and High-Level Workflows

Figure 1:
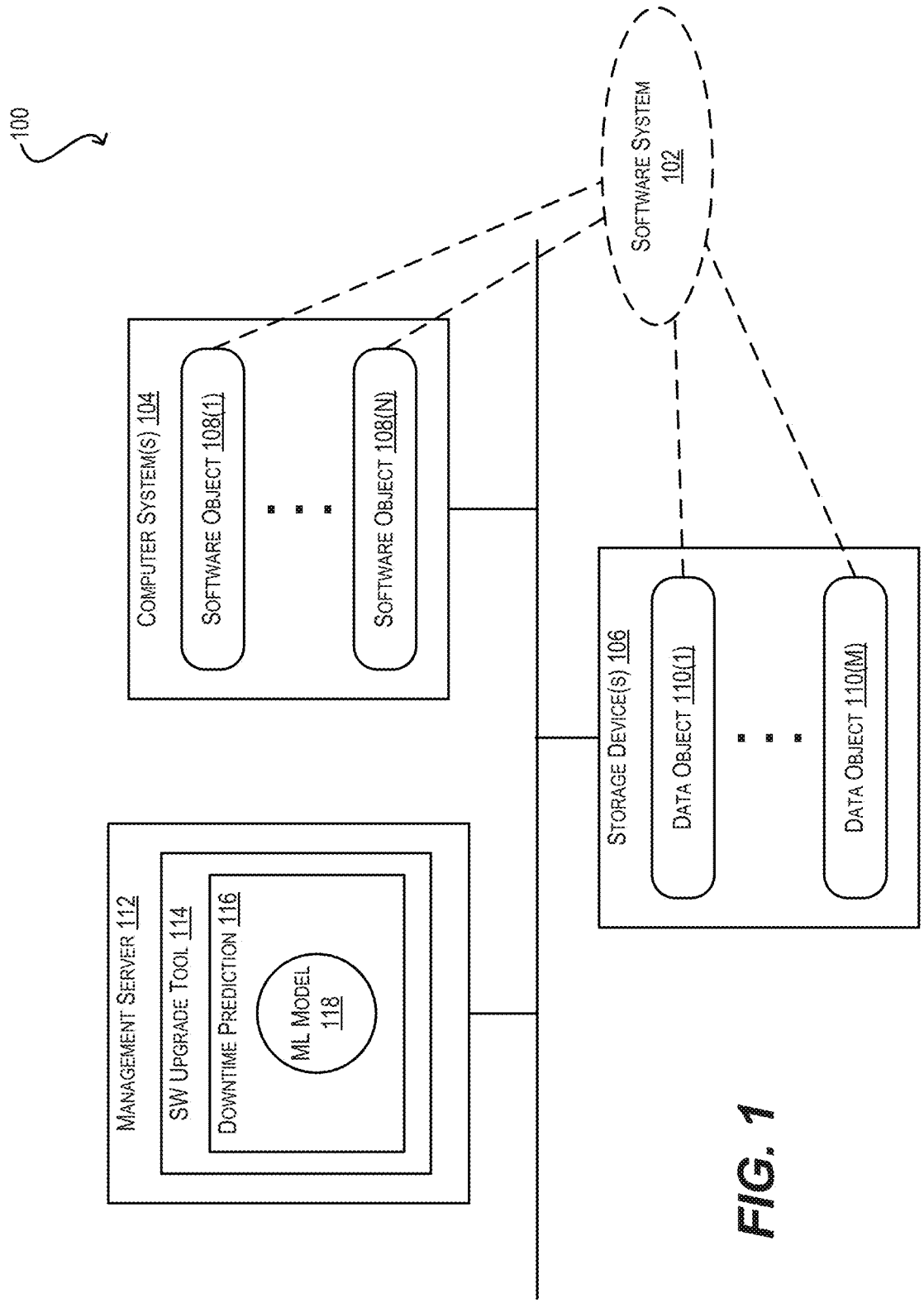
FIG. 1 depicts an example software system and example operating environment according to certain embodiments.

FIG. 1 is a simplified block diagram of an example software system 102 deployed in an example operating environment 100 according to certain embodiments. As shown, operating environment 100 includes one or more computer system(s) 104 that are communicatively coupled with one or more storage device(s) 106. Computer system(s) 104 are configured to run or maintain a number of software objects 108(1)-(N) that collectively comprise the software stack of software system 102. Examples of software objects 108(1)-(N) include programs, scripts, classes, application programming interfaces (APIs), libraries, plug-ins, drivers, adapters, and the like.

Storage device(s) 106 are configured to store a number of data objects 110(1)-(M) that hold data and/or metadata used by software objects 108(1)-(N). Examples of data objects 110(1)-(M) include files, database tables, key-value stores, registries, and the like. Generally speaking, the nature and number of software objects 108(1)-(N) and data objects 110(1)-(M) can vary depending on the type and implementation of software system 102.

In addition to computer system(s) 104 and storage device(s) 106, operating environment 100 includes a management server 112 configured to run a software upgrade tool 114. In various embodiments, the administrators of software system 102 can use tool 114 to apply upgrades to the system and thereby update one or more portions of the system's software stack (e.g., software objects 108(1)-(N)) and/or data (e.g., data objects 110(1)-(M)). While the term "upgrade" is often associated with the notion of enhancement, "upgrade" as used herein may refer to any type of code or data change to a software system and thus is not limited to changes that strictly enhance or expand the capabilities of the system. For example, an upgrade in the context of the present disclosure may involve the installation of a patch that simply fixes one or more bugs, without adding new features.

As noted in the Background section, in many cases the process of upgrading a software system such as system 102 of FIG. 1 will result in some downtime during which the system is unavailable to end-users. The ability to predict the length of this downtime prior to initiating the upgrade has high value for the system's administrators because it facilitates upgrade planning. However, it is generally difficult for the administrators to perform these predictions in a reliable manner. This is particularly true if the software system is large or complex because there are usually a large number of interrelated factors in such systems that can affect upgrade downtime length.

One known approach for upgrade downtime prediction involves applying an upgrade to an instance of a software system in a test environment (i.e., an operating environment that is used for testing rather than production purposes) and measuring the downtime of the system in that test environment. The measured downtime can then be used as an estimate of the downtime that will be experienced in the actual (e.g., production) environment where the upgrade will be installed. But, this approach is inefficient because it requires the upgrade to be applied twice—once in the test environment and again in the actual environment. Further, there may be differences between the test and actual environments such as system hardware differences, data differences, system configuration differences, and so on that can cause the upgrade downtimes experienced in these two environments to diverge.

To address the foregoing and other issues, operating environment 100 of FIG. 1 is enhanced to include a novel downtime prediction component 116 comprising a novel ML model 118 according to embodiments of the present disclosure. In various embodiments, downtime prediction component 116 can leverage ML model 118 to predict, using machine learning techniques, the downtime that will be experienced by software system 102 due to an upgrade of the system. Notably, downtime prediction component 116 can achieve this with relatively high accuracy (assuming ML model 118 is sufficiently trained), regardless of the size or complexity of system 102. In addition, the machine learning techniques employed by downtime prediction component 116 do not require the upgrade to be applied in a duplicate test environment. Thus, component 116 advantageously enables upgrade downtime prediction in a manner that is more efficient and reliable than before.

Figure 2:
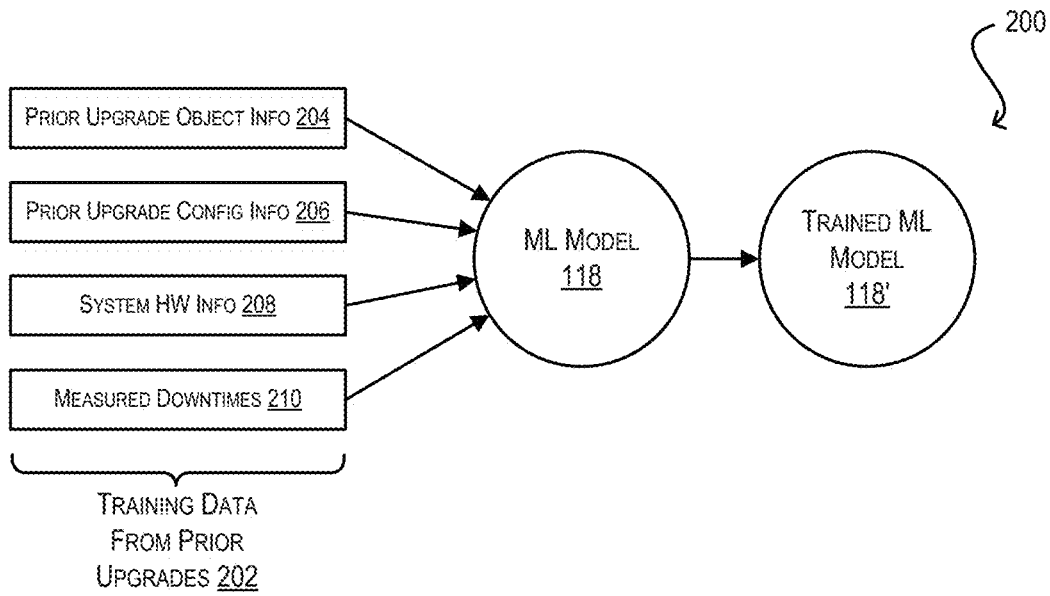
FIG. 2 depicts a high-level workflow for training a machine learning (ML) model designed to predict upgrade downtimes according to certain embodiments.

FIG. 2 depicts a high-level workflow 200 of a training process that may be executed by downtime prediction component 116 for initially training/building ML model 118 according to certain embodiments. As shown in FIG. 2, downtime prediction component 116 can receive as input training data 202 pertaining to prior upgrades applied to software system 102 in operating environment 100 (and/or other operating environments). Training data 202 can include, for each prior upgrade event, (1) prior upgrade object information 204 (e.g., the software and/or data objects deployed as part of the prior upgrade), prior upgrade configuration information 206 (e.g., the number and order of phases in the prior upgrade, the number of concurrent processes used to execute the prior upgrade, etc.), (3) system hardware information 208 (e.g., the characteristics of the physical hardware in the operating environment where the software system was deployed), and (4) measured downtime 210 (i.e., the length of downtime measured for the prior upgrade).

Downtime prediction component 116 can pass training data 202 to ML model 118, which can adjust various internal weight factors to arrive at measured downtimes 210 based on items 204-208. The result of this process (which may be repeated on an ongoing basis) is a trained ML model 118' that is tuned to predict upgrade downtimes for software system 102.

Figure 3:
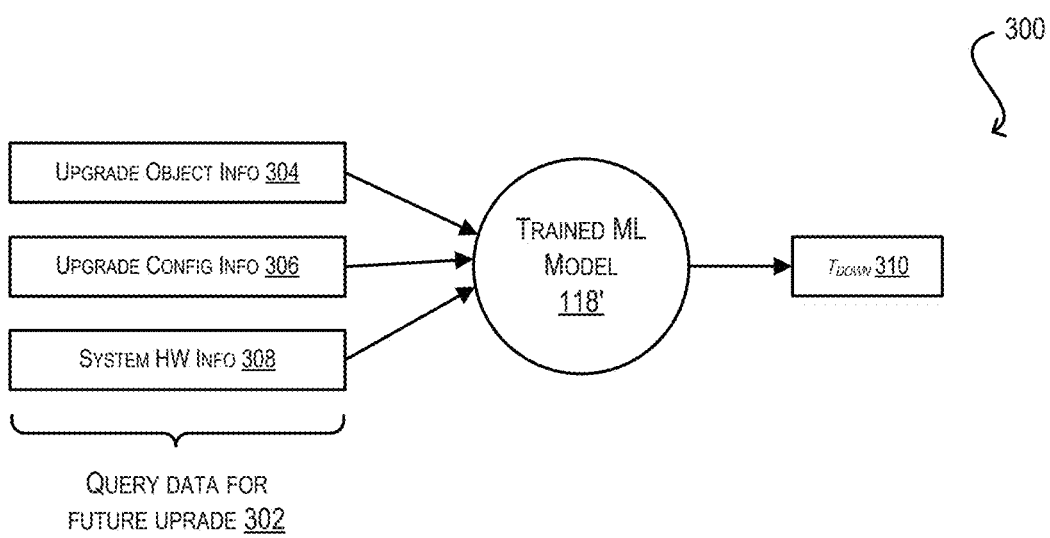
FIG. 3 depicts a high-level workflow for querying the ML model trained via the workflow of FIG. 2 according to certain embodiments.

FIG. 3 depicts a high-level workflow 300 of a query process that may be executed by downtime prediction component 116 for predicting the downtime of a future upgrade of software system 102 according to certain embodiments. Workflow 300 assumes that ML model 118 has been trained to some extent per workflow 200 (resulting in trained ML model 118'). However, because workflow 200 is not necessarily a finite process (in other words, it can be repeated continuously as new training data comes in), in some embodiments workflow 300 may be performed in an overlapping manner with workflow 200.

As shown in FIG. 3, downtime prediction component 116 can receive as input query data 302 pertaining to a particular future upgrade U to be applied to software system 102 in a particular operating environment E (e.g., operating environment 100). Query data 302 can include upgrade object information 304 for upgrade U, upgrade configuration information 306 for upgrade U, and system hardware information 308 for operating environment E.

Based on this query data, trained ML model 118' can generate a predicted downtime value $t_{down}$ (310) indicating the likely downtime that will be experienced by software system 102 when upgrade U is applied to the system in operating environment E. Predicted downtime value $t_{down}$ can then be used for various purposes. For example, although not shown in FIG. 3, in one set of embodiments $t_{down}$ can be presented to one or more individuals (e.g., system administrators) for their review. In another set of embodiments, $t_{down}$ can be provided as input to a downstream engine that can invoke one or more automated actions based on this value.

The remaining sections of the present disclosure describe the specifics of ML model 118 according to certain embodiments, as well as provide more detailed flowcharts for the high-level training and query workflows shown in FIGS. 2 and 3. It should be appreciated that FIGS. 1-3 are illustrative and not intended to limit embodiments of the present disclosure. For example, although downtime prediction component 116 is shown in FIG. 1 as being a part of upgrade tool 114 on management server 112, in other embodiments component 116 can be implemented separately from tool 114 and on any machine within or outside of operating environment 100. For example, in a particular embodiment, downtime prediction component 116 may be implemented in a remote cloud and accessed via a web-based or mobile interface. One of ordinary skill in the art will recognize other variations, modifications, and alternatives.

3. ML Model Details

As mentioned previously, ML model 118 of FIG. 1 is a statistical model that is designed to output a predicted downtime value $t_{down}$ for an upgrade U of a software system S in a operating environment E based on various input data including, e.g., (1) upgrade object information for U, (2) upgrade configuration information for U, and (3) system hardware information for E. The model itself is trained using data from historical upgrades of S and thus encodes information regarding how (1)-(3) can be synthesized and merged to generate $t_{down}$.

In one set of embodiments, ML model 118 can be expressed in the form of the following equation:

$$t_{down} = \text{vector } p \times \text{matrix } D \times \text{matrix } C \times \text{matrix } L \times \text{matrix } R \times \text{matrix } S \times \text{vector } v_{st}$$

Each of the right-hand components of this equation are described in turn below.

3.1 Vector p

In one set of embodiments, vector p is a vector that represents the performance or capabilities of the hardware in operating environment E (in other words, the hardware on which software system S is deployed). For instance, in the example of FIG. 1, this hardware would include, among other things, computer system(s) 104 and storage device(s)

106. Vector p will generally be provided as input to ML model 118 during both the training and query phases.

Figure 4:
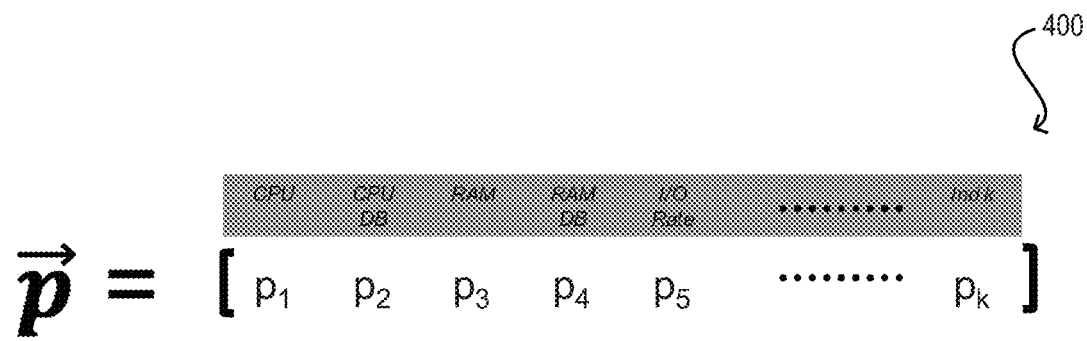

FIG. 4 depicts a representation 400 of vector p according to an embodiment. As shown in this representation, vector p comprises k dimensions where each dimension corresponds to a hardware performance/capability indicator for operating environment E. For instance, the first dimension depicted in FIG. 4 corresponds to a CPU performance indicator, the second dimension corresponds to a database (DB) CPU performance indicator, the third dimension corresponds to a memory (i.e., RAM) size indicator, the fourth dimension corresponds to a DB memory size indicator, and the fifth dimension corresponds to an I/O rate indicator. It should be appreciated that the depicted indicators are illustrative and any other type of hardware performance/capability indicator known in the art (e.g., network bandwidth, network latency, disk space, etc.) may also be used.

Each component of vector p is a value $p_1 \ldots p_k$ that quantifies its corresponding performance/capability indicator with respect to operating environment E. For example, for the first dimension in FIG. 4, $p_1$ may be a value that quantifies the CPU performance of one or more computer systems in operating environment E in the form of FLOPs (floating point operations per second). As another example, for the third dimension in FIG. 4, $p_3$ may be a value that quantifies the total RAM size of the computer systems in E in the form of GB (gigabytes).

In certain embodiments, it is assumed that vector values $p_1 \ldots p_k$ are determined in some standardized manner so that the values determined for one operating environment can be directly comparable to the values determined for another operating environment. One way to achieve this is to ensure that values $p_1 \ldots p_k$ are determined using standard benchmark tests or tools.

It is also assumed that (1) during the execution of upgrade U, the upgrade is the only activity in operating environment E, and (2) the hardware of operating environment E is sufficiently sized to run software system S and to carry out the upgrade. These assumptions avoid complicating the model with difficult-to-quantify factors such as the effects of concurrent system resource use and are based on assumptions of Queuing Theory which indicate that, without sufficient resources, chaotic conditions in terms of upgrade completion may apply. Under such chaotic conditions, downtime predictions would be more difficult, if not impossible, to calculate.

3.2 Vector $v_{st}$

In one set of embodiments, vector $v_{st}$ is a vector that describes the stack components (e.g., software and/or data objects) of software system S that will be deployed as part of upgrade U. Vector $v_{st}$ will generally be provided as input to ML model 118 during both the training and query phases.

Figure 5:
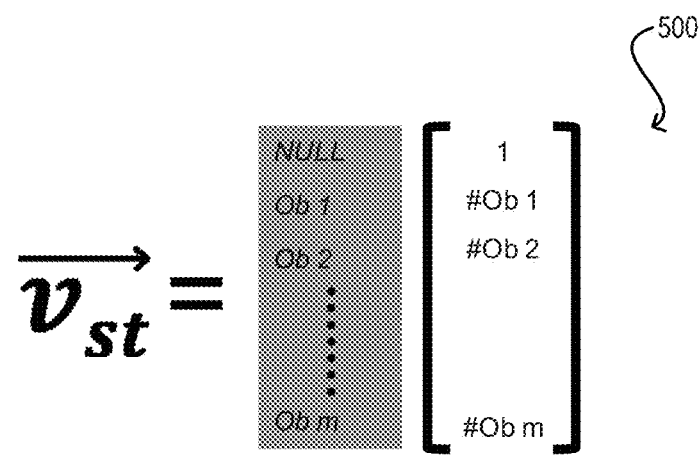

FIG. 5 depicts a representation 500 of vector $v_{st}$ according to an embodiment. As shown in this representation, vector $v_{st}$ comprises m+1 dimensions where each of the last m dimensions corresponds to a distinct software or data object type that is part of the upgrade. Examples of such object types include program, class, database table, etc.

Each component of vector $v_{st}$ (except for the first component) is a value $\# Obj_t \ldots \# Obj_m$ that quantifies the total number of objects of the corresponding object type in upgrade U. For example, if the second dimension of $v_{st}$ corresponds to a "database table" object type and there are 1000 database tables included in the upgrade, the value of $\# Obj_1$ will be 1000.

In addition to the above, vector $v_{st}$ includes a NULL component for the first dimension. In various embodiments, this NULL component is meant to represent upgrade tasks that are independent of the stack components (e.g., infrastructure work that has the same complexity for every upgrade event, regardless of the software/data objects being applied/upgraded) and thus is set to default value of 1.

3.3 Matrix D

In one set of embodiments, matrix D is a matrix that describes the deployment procedure of upgrade U—in other words, the phases via which upgrade U is deployed and how the execution of these phases is affected by the performance/capabilities of the underlying hardware in operating environment E. Matrix D will generally be determined/trained via regression analysis during the training phase and then applied by the ML model during the query phase.

Figure 6:
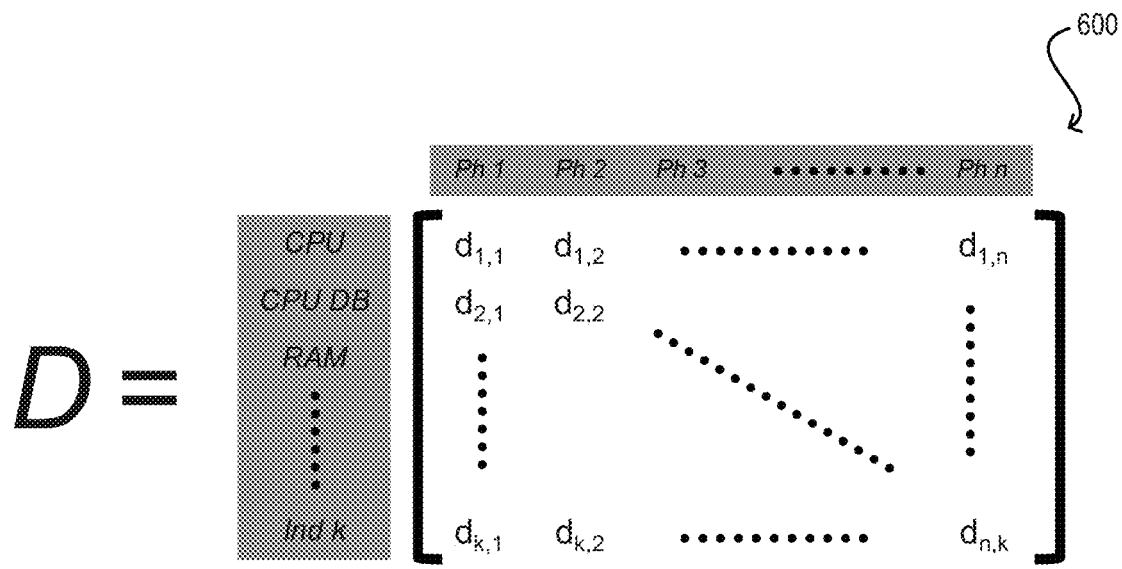

FIG. 6 depicts a representation 600 of matrix D according to an embodiment. As shown in this representation, matrix D comprises n by k dimensions where n is the total number of phases in upgrade U and k is the total number of hardware performance/capability indicators determined for operating environment E (as noted earlier).

Each entry in matrix D is a weight factor that indicates the extent to which the phase corresponding to the entry depends on the hardware performance/capability indicator corresponding to the entry. For example, certain phases of an upgrade may be very data intensive and highly reliant on disk I/O; for these phases, the entries in matrix D corresponding to a disk I/O indicator may have relatively high weight factors while the entries corresponding to other types of performance/capability indicators (e.g., CPU power) may have relatively lower weight factors.

It should be noted that the configuration of upgrade U can affect the number and/or ordering of phases that are executed, as well as the workload for each phase. Accordingly, in some cases different instances of matrix D may be determined for different upgrade configurations/strategies.

3.4 Matrix S

In one set of embodiments, matrix S is a matrix that describes the dependence of the phases of upgrade U on the various software/data objects types included in the upgrade. Matrix S will generally be provided as input to ML model 118 during both the training and query phases.

Figure 7:
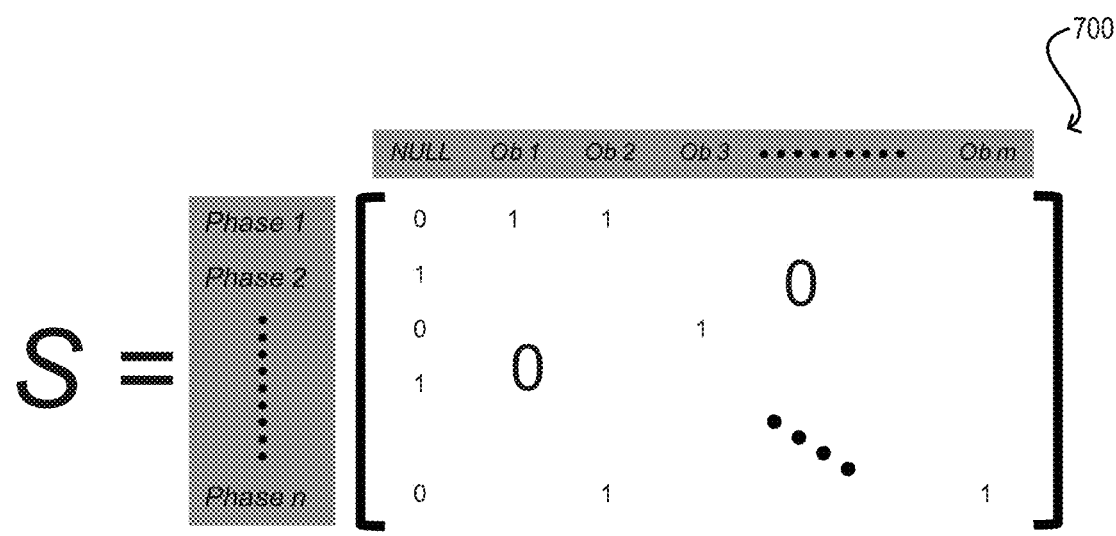

FIG. 7 depicts a representation 700 of matrix S according to an embodiment. As shown, matrix S comprises n by (m+1) dimensions where n is the total number of phases in upgrade U and m is the total number of object types included in the upgrade. In the embodiment of FIG. 7, each entry in matrix S has a value of 0 or 1 where 0 indicates that the corresponding phase does not handle/apply/persist the corresponding object type and where 1 indicates that the corresponding phase does handle/apply/persist the corresponding object type. Thus, in this embodiment, each matrix entry is a binary mapping of phase to object type. This approach enables matrix S to be defined manually and remain static. Note that there is a NULL object type dimension in the matrix as mentioned previously with respect to vector $v_{st}$; if there is a value 1 in this dimension, that means that the corresponding phase performs one or more stack-independent tasks.

In an alternative embodiment (not shown), each entry in matrix S can be a variable weight factor that indicates the extent to which a given object type contributes to the total workload/complexity for the corresponding phase. In this embodiment, the variable weight factors can be determined via regression analysis during the training phase.

3.5 Matrix C

In one set of embodiments, matrix C is a matrix that describes the client dependence of upgrade U, where a client is an entity that interacts with and consumes the services provided by software system S.

Figure 8:
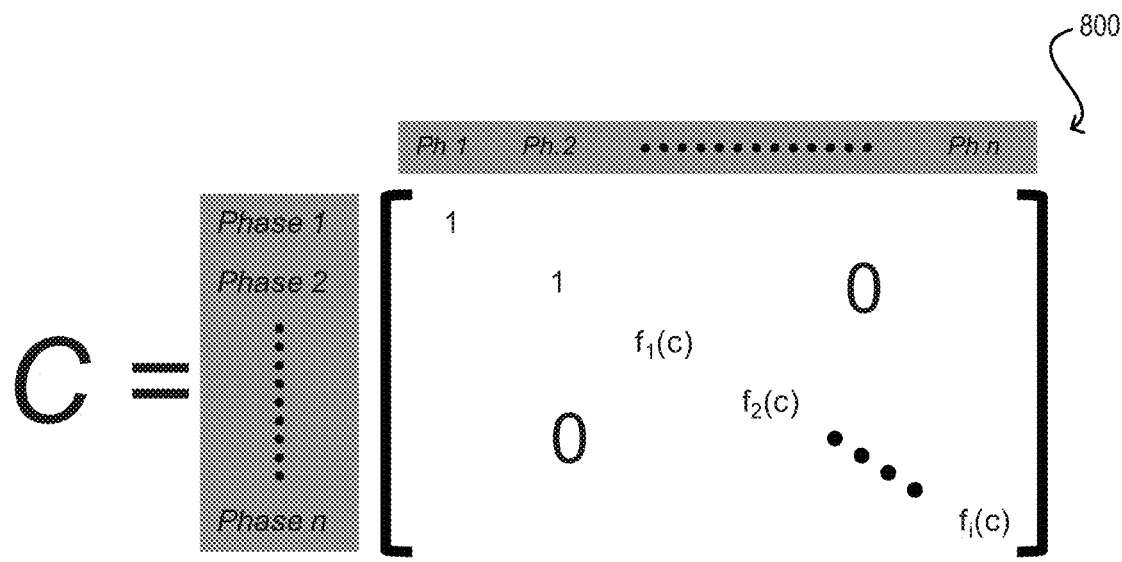

FIG. 8 depicts a representation 800 of matrix C according to an embodiment. As shown in this representation, matrix C comprises n by n dimensions where n is the total number of phases in upgrade U. Each entry on the diagonal of matrix C is a weight factor indicating the change in runtime of the corresponding phase due to a client count c. In various embodiments, client count c can be provided as input during the training phase and the weight factors in matrix C can be determined via regression analysis. The trained matrix can then be applied by the ML model during the query phase.

3.6 Matrix L

In one set of embodiments, matrix L is a matrix that describes the influence of the number of installed languages in software system S on upgrade U. This matrix will typically be relevant for software systems that are translated into a significant number of different languages.

Figure 9:
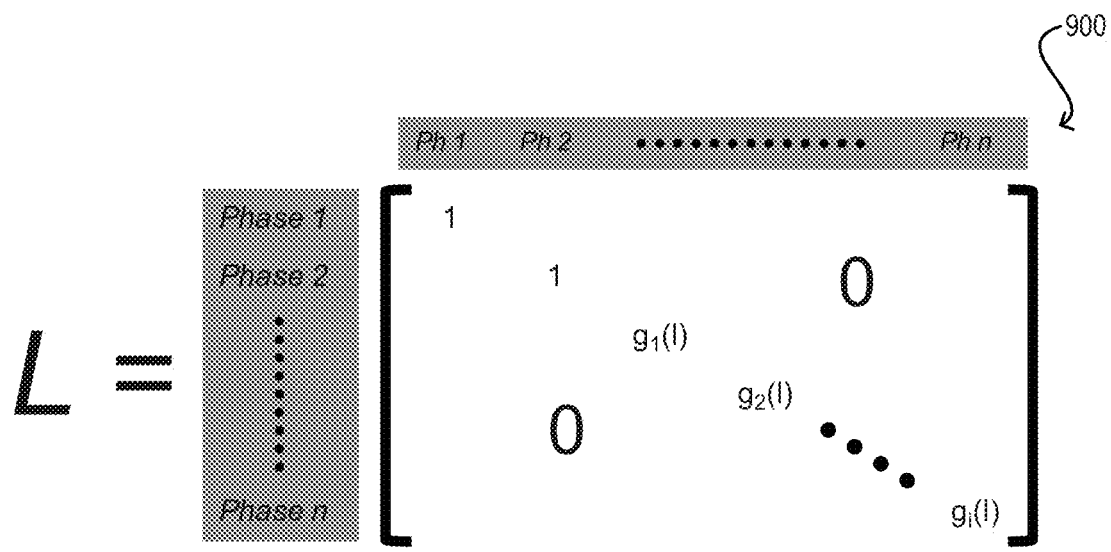

FIG. 9 depicts a representation 900 of matrix L according to an embodiment. As shown in this representation, matrix L comprises n by n dimensions where n is the total number of phases in upgrade U. Each entry on the diagonal of matrix L is a weight factor indicating the change in runtime of the corresponding phase due to an installed language count l. In various embodiments, installed language count l can be provided as input during the training phase and the weight factors in matrix L can be determined via regression analysis. The trained matrix can then be applied by the ML model during the query phase.

3.7 Matrix R

In one set of embodiments, matrix R is a matrix that describes the influence of the number of configured parallel processes on upgrade U. This matrix will typically be relevant for use cases where the number of parallel processes for upgrade execution can be configured by, e.g., a system administrator.

Figure 10:
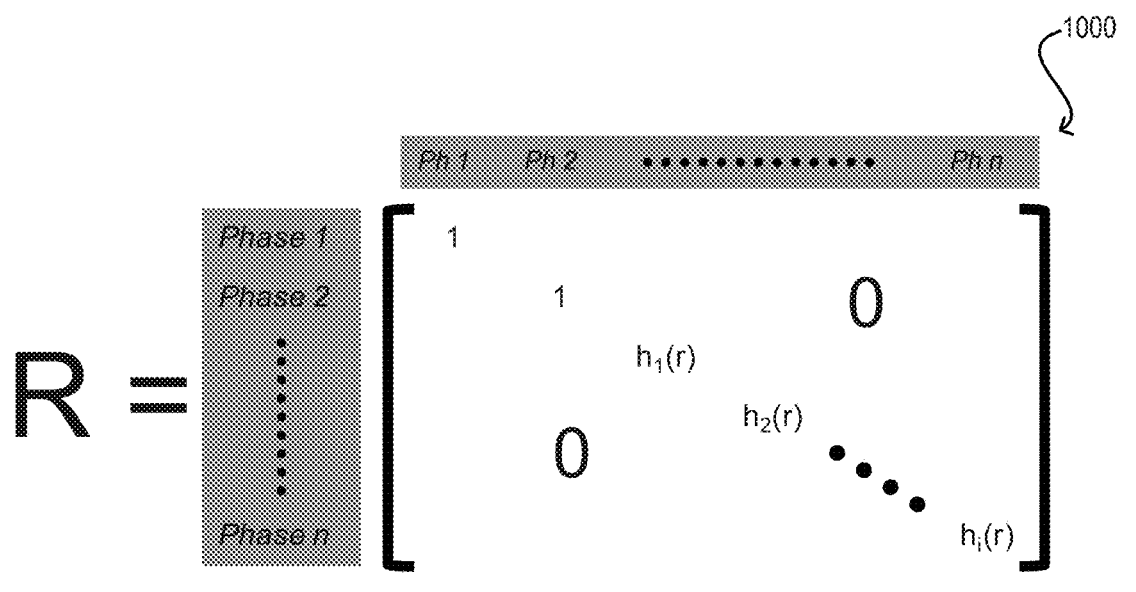

FIG. 10 depicts a representation 1000 of matrix R according to an embodiment. As shown in this representation, matrix R comprises n by n dimensions where n is the total number of phases in upgrade U. Each entry on the diagonal of matrix R is a weight factor indicating the change in runtime of the corresponding phase due to a parallel process count r. In various embodiments, parallel process count r can be provided as input during the training phase and the weight factors in matrix R can be determined via regression analysis. The trained matrix can then be applied by the ML model during the query phase.

4. Model Training

Figure 11:
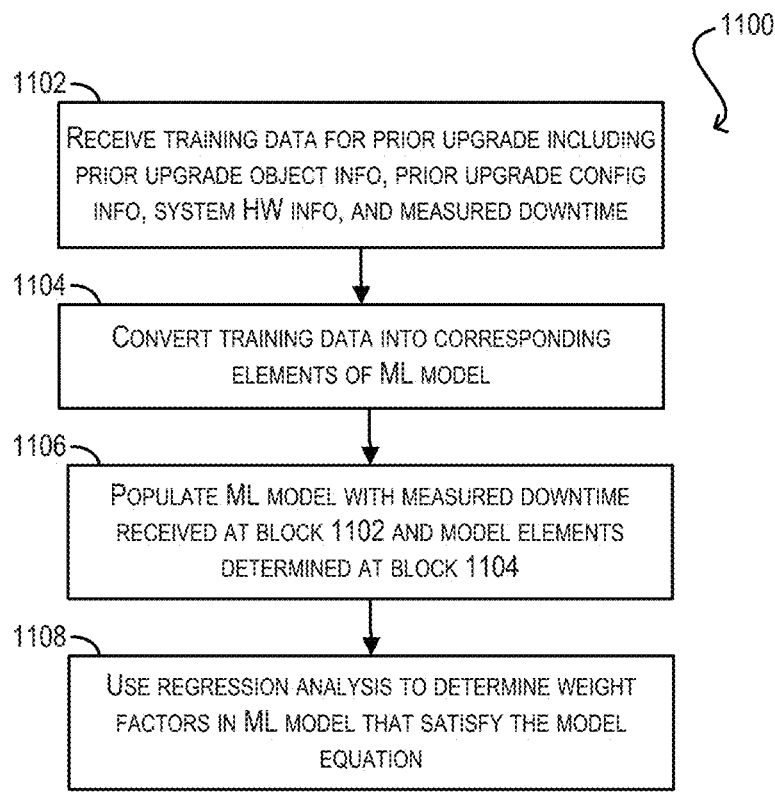
FIG. 11 depicts a model training flowchart according to certain embodiments.

FIG. 11 is a flowchart 1100 that provides additional details regarding the process of training ML model 118 (per workflow 200 of FIG. 2) according to certain embodiments. For ease of explanation, flowchart 1100 describes steps performed for processing training data pertaining to a single prior upgrade event; thus, this flowchart can be repeated as needed for further training data received for further prior upgrades.

Starting with block 1102, downtime prediction component 116 can receive training data for a prior upgrade U' applied to a software system S in an operating environment E'. This training data can include a measured downtime of system S due to prior upgrade U', upgrade object information for prior upgrade U' (e.g., the number and type of objects deployed in the upgrade), upgrade configuration information for prior upgrade U' (e.g., number of phases, number of clients, number of installed languages, etc.), and system hardware information for environment E' (e.g., performance/capability indicators and corresponding values).

At block 1104, downtime prediction component 116 can convert the training data received at step 1102 into corresponding elements of ML model 118. For example, assuming the model formulation described in Section (3) above, downtime prediction component 116 can convert the received upgrade object information into vector $v_{sr}$, convert the received upgrade configuration information into matrix S, convert the received system hardware information into vector p, and so on.

At block 1106, downtime prediction component 116 can populate ML model 118 with the measured downtime received at block 1102 and the model elements determined at block 1104. Finally, at block 1108, downtime prediction component 116 can use regression analysis to determine the various weight factors in ML model 118 (e.g., the weight factors of matrices D, C, L, and R) that will satisfy the model equation, thereby training the model.

5. Query Handling

Figure 12:
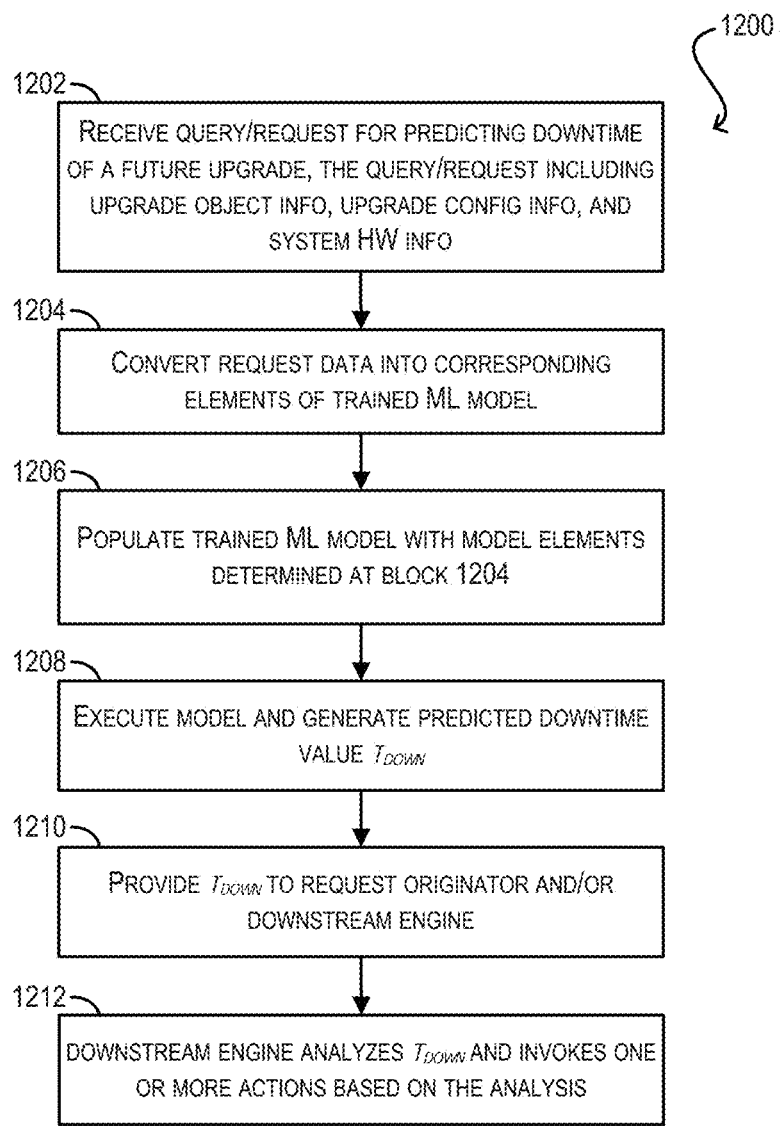
FIG. 12 depicts a query handling flowchart according to certain embodiments.

FIG. 12 is a flowchart 1200 that provides additional details regarding the process of handling/processing a query (or in other words, a prediction request) directed to trained ML model 118' per workflow 300 of FIG. 3 according to an embodiment. For ease of explanation, flowchart 1200 describes steps performed for processing a single query; thus, this flowchart can be repeated as needed for processing further queries.

Starting with block 1202, downtime prediction component 116 can receive a query/request for a predicted downtime that will be caused by applying a future upgrade U to a software system S in an operating environment E. This request can include upgrade object information for future upgrade U (e.g., the number and type of objects to be deployed in the upgrade), upgrade configuration information for future upgrade U (e.g., number of phases, number of clients, number of installed languages, etc.), and system hardware information for environment E (e.g., performance/capability indicators and corresponding values).

At block 1204, downtime prediction component 116 can convert the request data received at step 1202 into corresponding elements of trained ML model 118'. For example, assuming the model formulation described in Section (3) above, downtime prediction component 116 can convert the received upgrade object information into vector $v_{sr}$, convert the received upgrade configuration information into matrix S, convert the received system hardware information into vector p, and so on.

At block 1206, downtime prediction component 116 can populate trained ML model 118' with the model elements determined at block 1204. Downtime prediction component 116 can then execute the model, resulting in the generation of predicted downtime value $t_{down}$ (block 1208). In some embodiments, this generated value can be accompanied with a margin of error (e.g., plus or minus X time units).

Finally, at blocks 1210-1212, downtime prediction component 116 can provide predicted downtime value $t_{down}$ to the request originator and/or feed it to a downstream engine. In the latter case, the downstream engine can analyze $t_{down}$ and invoke one or more actions based on that analysis. For example, in one set of embodiments, the downstream engine can automatically initiate upgrade U in operating environment E or schedule the upgrade for a preplanned time if $t_{down}$ is less than a preconfigured lower threshold (e.g., 1 hour). As part of this, the downstream engine can automatically send a notice to end-users of software system S indicating the predicted period during which the system will be unavailable.

In another set of embodiments, the downstream engine can automatically signal an alert or escalation if $t_{down}$ exceeds a preconfigured upper threshold (e.g., 8 hours). This alert or escalation can include, e.g., a request to management for approval to proceed with upgrade U in view of the potential extended downtime.

In yet another set of embodiments, the downstream engine can automatically determine and generate one or more recommendations for reducing the predicted downtime. This process can involve, e.g., analyzing one or more of the inputs provided with the request at block 1202 and determining how the predicted downtime may change if one or more of the inputs are changed. For instance, the downstream engine may determine that the predicted downtime can be substantially reduced if the number of parallel processes is increased and thus can generate a recommendation to this effect. In certain embodiments, each generated recommendation can include a description of the recommended action (e.g., increase number of parallel processes from X to Y) as well as an indication of the likely downtime reduction that will be achieved via that action (e.g., reduction of 50%).

6. Computer System

Figure 13:
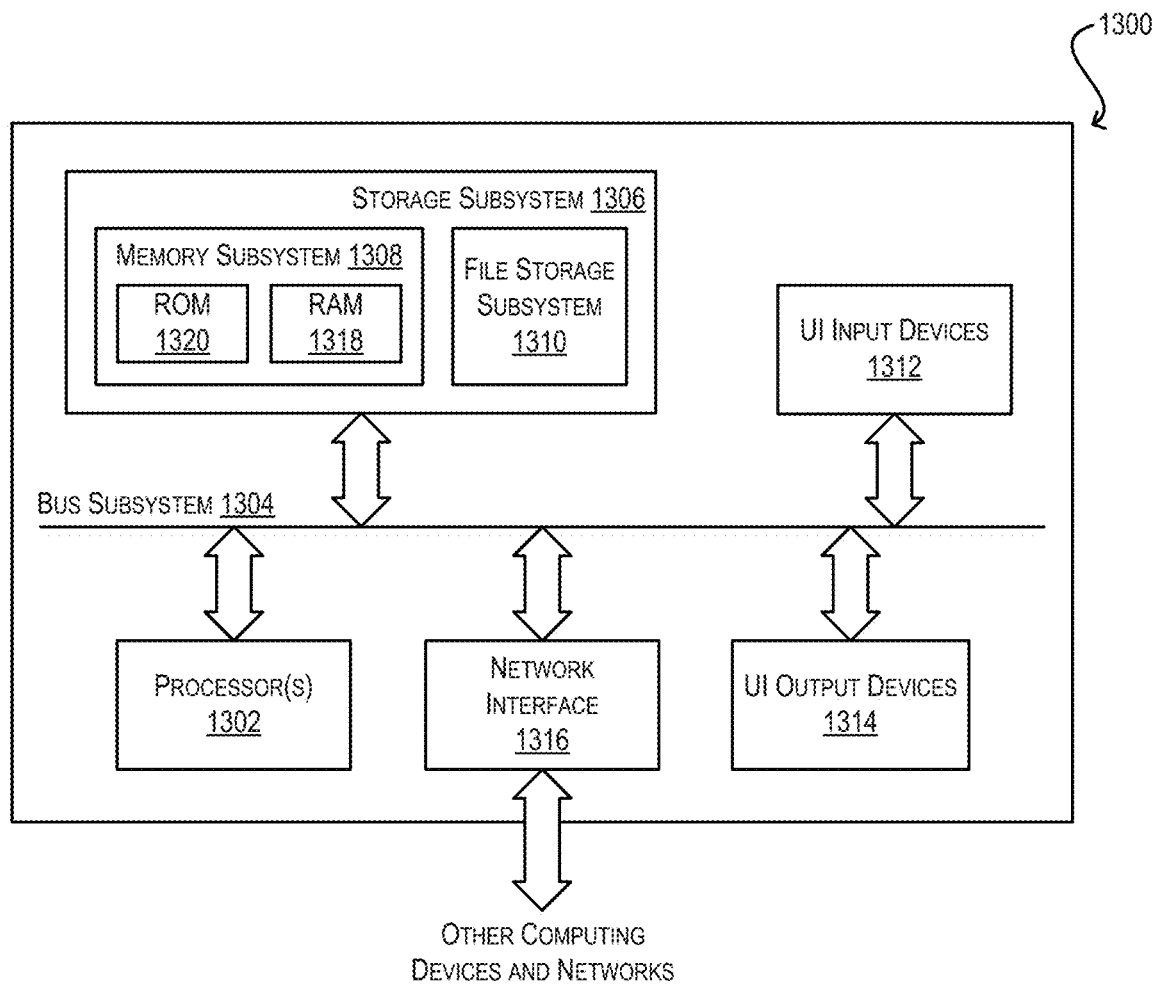
FIG. 13 depicts an example computer system according to certain embodiments.

FIG. 13 depicts an example computer system 1300 according to certain embodiments. Computer system 1300 may be used to run any of the software components, including downtime prediction component 116, described in the foregoing disclosure.

As shown, computer system 1300 can include one or more processors 1302 that communicate with a number of peripheral devices via a bus subsystem 1304. These peripheral devices can include a storage subsystem 1306 (comprising a memory subsystem 1308 and a file storage subsystem 1310), user interface input devices 1312, user interface output devices 1314, and a network interface subsystem 1316.

Bus subsystem 1304 can provide a mechanism for letting the various components and subsystems of computer system 1300 communicate with each other as intended. Although bus subsystem 1304 is shown schematically as a single bus, alternative embodiments of the bus subsystem can utilize multiple busses.

Network interface subsystem 1316 can serve as an interface for communicating data between computer system 1300 and other computing devices or networks. Embodiments of network interface subsystem 1316 can include wired (e.g., coaxial, twisted pair, or fiber optic Ethernet) and/or wireless (e.g., Wi-Fi, cellular, Bluetooth, etc.) interfaces.

User interface input devices 1312 can include a touchscreen incorporated into a display, a keyboard, a pointing device (e.g., mouse, touchpad, etc.), an audio input device (e.g., a microphone), and/or other types of input devices. In general, use of the term "input device" is intended to include all possible types of devices and mechanisms for inputting information into computer system 1300.

User interface output devices 1314 can include a display subsystem (e.g., a flat-panel display), an audio output device (e.g., a speaker), and/or the like. In general, use of the term "output device" is intended to include all possible types of devices and mechanisms for outputting information from computer system 1300.

Storage subsystem 1306 can include a memory subsystem 1308 and a file/disk storage subsystem 1310. Subsystems 1308 and 1310 represent non-transitory computer-readable storage media that can store program code and/or data that provide the functionality of various embodiments described herein.

Memory subsystem 1308 can include a number of memories including a main random access memory (RAM) 1318 for storage of instructions and data during program execution and a read-only memory (ROM) 1320 in which fixed instructions are stored. File storage subsystem 1310 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1300 is illustrative and many other configurations having more or fewer components than computer system 1300 are possible.

The above description illustrates various embodiments of the present disclosure along with examples of how aspects of the present disclosure may be implemented. The above examples and embodiments should not be deemed to be the only embodiments, and are presented to illustrate the flexibility and advantages of the upgrade downtime prediction techniques disclosed herein and as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A method comprising:
   training, by a computer system, a machine learning (ML) model to predict upgrade downtimes of a software system, the training comprising:
      receiving training data pertaining to at least one prior upgrade of the software system in a first operating environment, the training data including object information for the prior upgrade, configuration information for the prior upgrade, system hardware information for the first operating environment, and a measured downtime of the software system due to the prior upgrade; and
      modifying one or more weight factors of the ML model based on the training data;
   receiving, by the computer system, a request for a predicted downtime of the software system due to a future upgrade of the software system in a second operating environment, the request comprising query data that includes object information for the future upgrade, configuration information for the future upgrade, and system hardware information for the second operating environment; and
   generating, by the computer system, the predicted downtime using the trained ML model and the query data.

2. The method of claim 1 wherein the object information for the prior upgrade identifies one or more software and/or data objects deployed as part of the prior upgrade.

3. The method of claim 1 wherein the configuration information for the prior upgrade identifies one or more configuration parameters pertaining to the prior upgrade.

4. The method of claim 3 wherein the one or more configuration parameters include a number of phases of the prior upgrade.

5. The method of claim 3 wherein the one or more configuration parameters include a number of parallel processes used during the prior upgrade.

6. The method of claim 3 wherein the one or more configuration parameters include a number of clients associated with the software system in the first operating environment.

7. The method of claim 3 wherein the one or more configuration parameters include a number of installed languages for the software system in the first operating environment.

8. The method of claim 1 wherein the system hardware information for the first operating environment identifies performance and/or capability characteristics of hardware deployed in the first operating environment.

9. The method of claim 1 wherein the one or more weight factors that are modified based on the training data includes weight factors indicating an extent to which each phase of the prior upgrade is dependent on various hardware performance indicators derived from the system hardware information for the first operating environment.

10. The method of claim 1 wherein the one or more weight factors are modified in a manner that causes the ML model to arrive at the measured downtime based on the object information for the prior upgrade, the configuration information for the prior upgrade, and the system hardware information for the first operating environment.

11. The method of claim 1 wherein generating the predicted downtime using the trained ML model and the query data comprises converting the object information for the future upgrade into a vector $v_{st}$ of m+1 dimensions, wherein m equals a total number of software and/or data object types identified in said object information.

12. The method of claim 11 wherein a first component of the vector $v_{st}$ is set to a value of 1.

13. The method of claim 12 wherein each component of the vector $v_{st}$ after the first component is set to a value quantifying a number of software and/or data objects included in the future upgrade for the corresponding object type dimension.

14. The method of claim 1 wherein generating the predicted downtime using the trained ML model and the query data comprises converting the system hardware information for the second operating environment into a vector p of k dimensions, wherein each dimension corresponds to a hardware performance or capability indicator for the second operating environment, and wherein each component of the vector p quantifies a value for the corresponding hardware performance or capability indicator.

15. The method of claim 1 further comprising:
analyzing the predicted downtime that is generated using the trained ML model and the query data; and
invoking one or more actions based on the analyzing.

16. The method of claim 15 wherein the one or more actions include:

initiating or scheduling the future upgrade in the second operating environment if the predicted downtime is less than a preconfigured lower threshold;
signaling an alert or escalation if the predicted downtime exceeds a preconfigured upper threshold; or
determining and providing one or more recommendations for reducing the predicted downtime.

17. A non-transitory computer readable medium having stored thereon program code executable by a computer system, the program code comprising:
code that causes the computer system to predict, using a trained machine learning (ML) model and query data pertaining a future upgrade of a software system in an operating environment, a likely downtime of the software system due to the future upgrade, the query data including object information identifying one or more software and/or data objects to be deployed as part of the future upgrade, configuration information identifying one or more configuration parameters associated with the future upgrade, and system hardware information identifying one or more performance and/or capability characteristics of hardware in the operating environment;
code that causes the computer system to analyze the predicted downtime of the software system; and
code that causes the computer system to invoke one or more actions based on the analyzing of the predicted downtime.

18. The non-transitory computer readable medium of claim 17 wherein the one or more actions include:
initiating or scheduling the future upgrade in the operating environment if the predicted downtime is less than a preconfigured lower threshold;
signaling an alert or escalation if the predicted downtime exceeds a preconfigured upper threshold; or
determining and providing one or more recommendations for reducing the predicted downtime.

19. A computer system comprising: a processor; and a memory having stored thereon program code that, when executed by the processor, causes the processor to: receive a request to predict a downtime of a software system due to a future upgrade of the software system in an operating environment, the request comprising query data that includes: object information identifying software and/or data objects to be deployed in the future upgrade; configuration information identifying one or more configuration parameters associated with the future upgrade; and system hardware information for the operating environment identifying performance and/or capability indicators of hardware in the operating environment; convert the object information into a vector $v_{st}$ of m+1 dimensions, wherein m equals a total number of types of the software and/or data objects; convert the system hardware information into a vector p of k dimensions, wherein each dimension in the vector p corresponds to one of the performance and/or capability indicators; and generate the predicted downtime by: populating a trained machine learning (ML) model with the vector $v_{st}$, the vector p, and the one or more configuration parameters; and executing the trained ML model.

20. The computer system of claim 19 wherein the one or more configuration parameters include a number of parallel processes via which the future upgrade is configured to be executed.

* * * * *